Sept. 2, 1941.　　　L. O. E. ROESSEL　　　2,254,318
TRACTION DEVICE
Filed Feb. 4, 1939　　　2 Sheets-Sheet 1
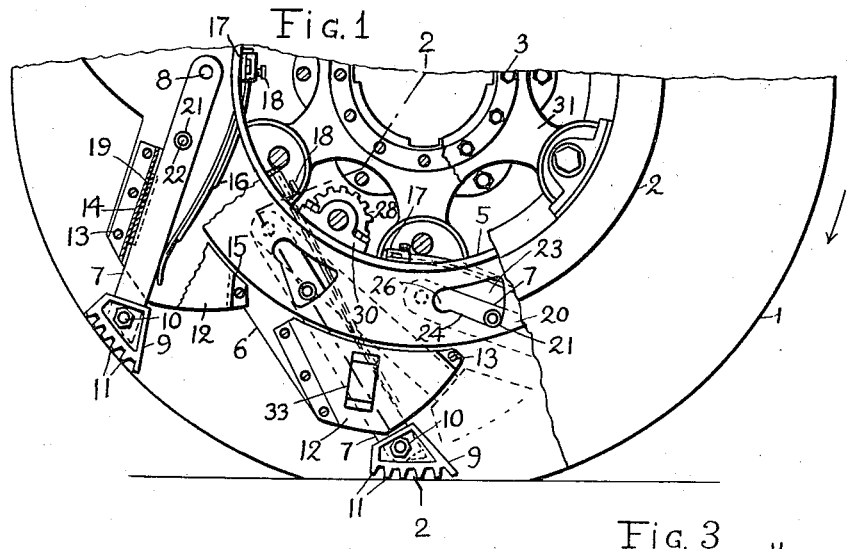
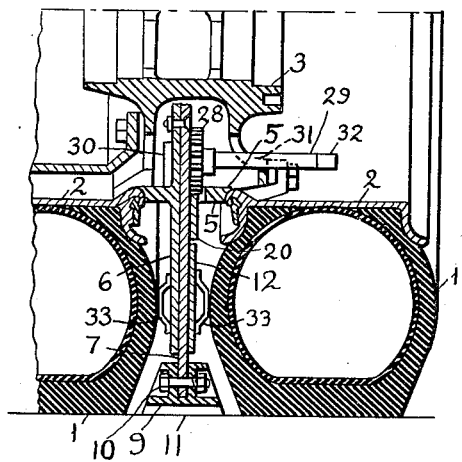
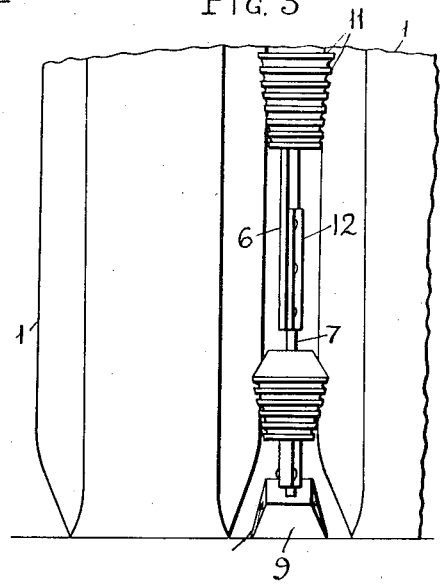
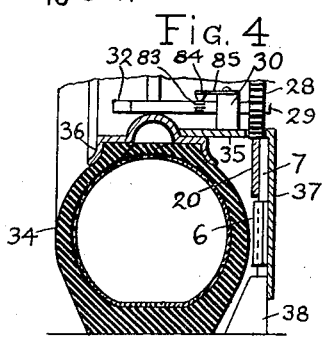
Louis Otto E. Roessel
INVENTOR.
BY　John P. Nikonow
ATTORNEY.

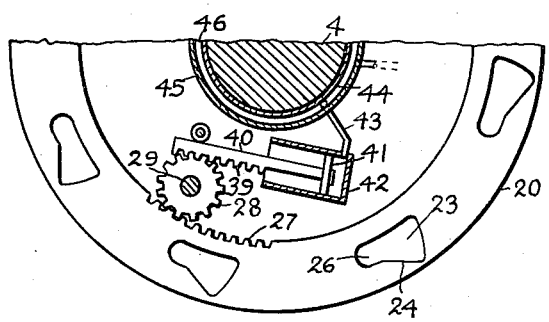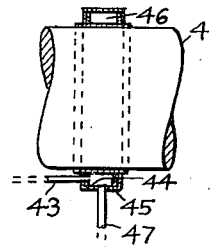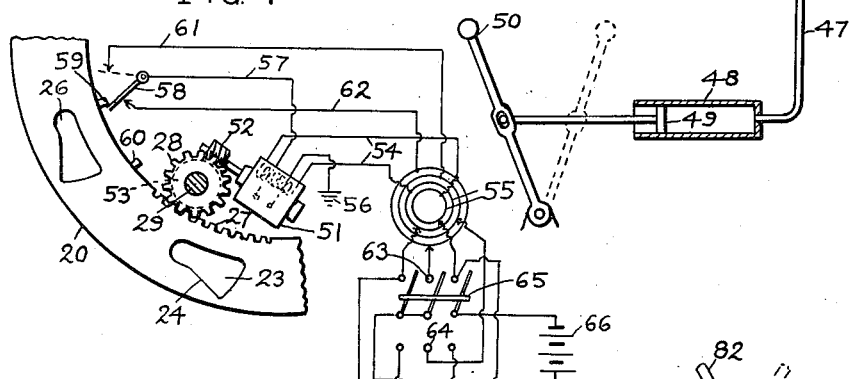

Patented Sept. 2, 1941

2,254,318

UNITED STATES PATENT OFFICE 2,254,318

TRACTION DEVICE

Louis Otto E. Roessel, Chappaqua, N. Y.

Application February 4, 1939, Serial No. 254,623

12 Claims. (Cl. 301—47)

My invention relates to antiskidding devices for automotive vehicles and has particular reference to devices employing antiskidding metal shoes or grippers rotating together with driving wheels of a vehicle.

In my Patent No. 2,044,812 and patent application No. 163,884, filed September 15, 1937, I disclosed antiskidding shoes mounted at the side of a wheel and adapted to slide radially for a yieldable engagement of the surface of the road. I have found, however, that for certain purposes it is desirable to employ antiskidding shoes mounted on pivoted swinging arms at the side of the wheel, the necessary pressure against the road surface being provided by suitably selected springs.

My invention has for its object therefore to provide an antiskidding device which will yieldably and tangentially press against the surface of the road with a predetermined pressure. The tangential arrangement has an advantage that the pressure against the road does not depend on the position of the shoe-supporting arm, while the pressure on the straight sliding arms varies, causing the arm to press against one or the other of its guides.

Another object of my invention is to provide means to adjust the spring tension for the arms in order to obtain the most desirable working pressure against the road surface.

Another object of my invention is to provide means to withdraw simultaneously all the shoes of one wheel into inoperative position. I employ for this purpose a cam-shaped ring engaging the arms and provided with a suitable mechanism for rotating the same for raising the arms against the spring pressure.

Still another object of my invention is to provide means to operate the arm-raising cam by a suitable remote control from the dashboard of the vehicle. Such a remote control can be effected electrically, using a small motor of a rotary or plunger type for operating the cam ring, a stop switch being provided at the ring for limiting its movement in either direction.

As a modification, I employ a hydraulic motor, such as a cylinder with a plunger for moving the cam-ring, the motor being operated by a small pump at the instrument board of the vehicle. A valve may be employed instead of the pump if a separate source of compressed fluid is used, as for instance, compressed air or vacuum.

As still another modification, I employ a mechanical means for moving the cam-ring, in the form of a star-wheel on the end of a pinion engaging the cam-ring, the star-wheel being engaged by a pin mounted on a stationary portion of the axle housing. The pin is so made that it can be placed in the operative position or withdrawn by means of a remote control from the dashboard of the vehicle.

My invention is more fully described in the accompanying specification and drawings in which—

Fig. 1 is a fractional elevational view of dual wheels partly in section showing my attachment.

Fig. 2 is a sectional view taken on the line 2—2 of Fig. 1.

Fig. 3 is a fractional end view of the dual wheels with my attachment.

Fig. 4 is a sectional view of an attachment for a single wheel.

Fig. 5 is a detail view of a hydraulic device for operating the cam ring.

Fig. 6 is a detail view of a control mechanism for the hydraulic operating device.

Fig. 7 is a diagrammatic view of an electric motor attachment for operating the cam ring.

Fig. 8 is a diagrammatic detail view of a mechanical attachment for operating the pinion at the cam ring with a hydraulic remote control.

Fig. 9 is a front view of a star wheel which is an element of the device.

Fig. 10 is an enlarged view of the lug engaging spring.

One of the embodiments of my invention is shown in Figs. 1, 2 and 3, which illustrates my device in application to dual wheels of a type used on trucks and busses. The wheels have rubber tires 1 on rims 2 supported on a common hub 3 for mounting on an axle 4 (Figs. 5 and 6). A spacing ring 5 is fitted between the rims and has a star-shaped flange 6 extending radially between the wheels and forming a support for arms 7 pivotally mounted on the flange at 8. The ends of the arms are provided with steel antiskidding shoes or grippers 9 held on the arms by bolts 10. The shoes have deep grooves which form teeth 11 so shaped that they can engage the surface of the road together with the tires 1. The grooves are made sufficiently deep so that the teeth remain effective even after considerable wear at the periphery. The arms move in guiding boxes formed of guiding plates 12 attached at the ends to the flange 6 by screws 13. The plates have end walls 14 and 15 forming stops for limiting the movement of the arms. The wall 14 determines the extreme outer position of the arms with the teeth of the shoe 9 slightly below the periphery of the tire 1. A leaf spring 16 presses the arm against the wall 14, the upper end of the spring being held in a clamp 17 attached to the inner side of the spacing ring 5. The tension of the spring can be regulated by a set screw 18 fitted in the clamp 17 and engaging the spring. A suitable aperture is provided for the spring in the spacing ring 5. A rubber buffer plate 19 is fitted in the wall 14, forming a cushion for the arm 7.

A mechanism is provided for bringing the arms 7 into inoperative positions, this mechanism comprising a cam ring 20 rotatively mounted on the periphery of the spacing ring 5 and resting on the arms 7. The arms are provided with rollers 21 mounted on pins 22, the rollers extending into slots 23 in the cam ring, the edges of the ring in the slots having cam-shaped surfaces 24 engaging the rollers 21.

The cam surfaces are so arranged that by turning the cam ring in one direction (counterclockwise in Fig. 1), the arms are made to turn on their shafts or pivots 25 until they are raised into the inoperative position against the inner walls 15. A recess or pocket 26 is provided at the end of the cam surface 24 for the roller 21 in order to prevent spontaneous sliding back of the cam ring. For turning the cam ring, it is provided with gear teeth 27 in mesh with a pinion 28 on a shaft 29 journaled in a bracket 30 supported on the spacing ring 5. The shaft 29 extends between spokes 31 of the wheel and has a square end 32 for use with a wrench or other suitable tool for turning the pinion.

In the position of the shoes shown in Fig. 1, the cam ring is turned in the clockwise direction so that the arms are set free and rest on the rubber buffers or cushions 19. The teeth 11 remain at a small distance from the periphery of the tires so that they do not touch the ground until the tire begins to be compressed, thereby largely suppressing the noise which the shoes may make when striking the ground. The arms with the shoes meet the ground at an angle and are readily deflected together with the tires, the extreme deflected position being shown in dotted lines in Fig. 1. The shoes are made of a width somewhat smaller than the distance between the two tires as shown in Fig. 2 so that they are free to move inwardly between the tires. Spacing clips or blocks 33 may be provided at the sides of the flange 6 and plates 12 in order to prevent any side vibrations or deflections of the flange 6 by wedging the mechanism between the sides of the tires 1.

A modified mechanism is shown in Fig. 4 which shows a single tire 34 of a type used on passenger automobiles. A ring 35 is attached to the rim 36, corresponding to the spacing ring 5 and having a flange 37 corresponding to the flange 6. Shoes 38 are flat at the outer side and slide over the flange 37.

A remote control mechanism can be provided for operating the cam ring 20. One type of such mechanism is shown in Figs. 5 and 6. The pinion 28 is engaged by a rack 39 on a rod 40 having a piston 41 at the end sliding in a cylinder 42 mounted on the spokes of the wheel. A pipe 43 extends from the cylinder to a hollow ring 44 mounted on the axle 4. A stationary hollow ring 45 encloses the ring 44, forming a chamber 46. It is connected by a pipe 47 with the end of a control cylinder 48, which may be mounted within reach of the operator of the vehicle. The cylinder has a plunger 49 operated by a handle 50. It is evident that by moving the handle 50, the liquid in the system will be displaced, causing the piston 41 to move in the same direction as the plunger 49.

Instead of the hydraulic motor as represented by the cylinder 42 and piston 41, any other suitable motor may be employed for moving the cam ring, as, for instance, an electric motor 51 as shown in Fig. 7. The motor has a worm 52 in mesh with a worm gear 53 mounted on the shaft 29 of the pinion 28. Field coils of the motor are connected by leads 54 with collector rings 55 on the axle 4. One terminal of the armature is grounded at 56, the other terminal being connected by a lead 57 with a stop switch 58. The latter is operated by lugs 59 and 60 on the cam ring 20 at the end of the movement of the ring. The respective contact points of the switch are connected by leads 61 and 62 with contact points 63 and 64 of a double throw reversing switch 65 on the dashboard of the vehicle within the operator's reach. The switches control current from a battery 66 for the motor in such a manner that when the movement of the cam ring is complete in one direction, the circuit is disconnected but can be closed by reversing the main switch for movement in the other direction.

Another modification is shown in Figs. 8 and 9. The pinion 67 is mounted on a shaft 68 threaded for axial movement in a bracket 69. The pinion is substantially wider than the ring 20 so that it remains in mesh within its operating limits. A star wheel 70 is mounted on the end of the shaft 68 and can be engaged by fingers 71 or 72 on a rod 73 extending from a piston 74 in a hydraulic cylinder 75. Springs 76 urge the piston to remain in the middle of the cylinder in the neutral position, when both fingers 71 and 72 are moved away from the star wheel. The ends of the cylinder are connected by pipes 77 and 78 with a double valve 79 at the control point within reach of the operator, the valve being connected by an intake pipe 80 with a source of fluid under pressure, which may be a liquid or compressed air. The cylinder is mounted on a housing for the axle which carries the wheels and is therefore relatively stationary while the star wheel rotates with the wheel of the vehicle. In the position of the valve shown in Fig. 8, the upper end of the cylinder is energized while the lower end is connected with an exhaust pipe 81 so that the piston will be moved downward, bringing the finger 71 in engagement with the star wheel. The latter will be therefore turned one tooth with every revolution of the vehicle wheel, causing the shaft 68 to advance in the bracket 69. The finger 71 is so positioned that it becomes disengaged from the star wheel when the cam ring 20 is moved to a full distance required for lowering the arms 7 into the operative position. The rotation of the shaft 68 will be then stopped and the device will remain operative as long as the valve handle 82 is in the "on" position. By placing the handle in the "off" position, the flow of the operating fluid is reversed and the piston will be withdrawn into the cylinder upward, causing the finger 72 to engage the star wheel for its rotation in the opposite direction, the fingers 71 and 72 being diametrically opposite each other.

The shaft 68 will then turn in the opposite direction until the star wheel 70 is disengaged from the finger 72, coming under the finger 71 to be engaged by the latter when the valve handle is again placed in the "on" position. Rollers 83 are provided for guiding the rod 73.

In order to retain the cam ring 20 in any intermediate position for holding the shoes 9 at a desired distance from the ground, a yieldable locking device may be provided for the shaft of the pinion 28 or 68 as shown in Fig. 4. The shaft is provided with teeth 83 engaged by a spring hook 84 on a spring 85 mounted on the bracket 30 and adapted to prevent the shaft from spontaneous rotation but allowing its forced movement when turned by the wrench.

It is understood that my device may be further modified without departing from the spirit of my invention as set forth in the appended claims.

I claim as my invention:

1. In an antiskidding device for a wheel of an automotive vehicle comprising arms, means to pivotally support the arms at the inner ends on the wheel tangentially to a circle concentric to the axis of the wheel, antiskidding shoes at the outer ends of the arms adapted to engage the roadway, leaf springs at the sides of the arms for urging the arms outward, and guides for the arms in the form of flat boxes supported on the wheel and adapted to limit the outward movement of the arms so as to prevent the outer portions of the shoes from extending beyond the periphery of the wheels.

2. An antiskidding device for automotive vehicles comprising arms, means to pivotally support the arms at the inner ends on a wheel of a vehicle tangentially to a circle concentric to the axis of the wheel, antiskidding shoes at the outer ends of the arms adapted to engage the roadway, means to yieldably urge the arms outward, guides for the arms supported on the wheels adapted to limit the movements of the arms, and yieldable buffers in the guides forming stops for the arms in their outward position.

3. An antiskidding device for automotive vehicles comprising arms, means to pivotally support the arms at the inner ends on a wheel of a vehicle tangentially to a circle concentric to the axis of the wheel, antiskidding shoes at the outer ends of the arms adapted to engage the roadway, guides for the arms supported on the wheels, means in the guides for limiting the movements of the arms, and leaf springs in the guides pressing by their outer ends against the arms for urging them outward, means to support the inner ends of the springs on the wheel.

4. An antiskidding device for automotive vehicles comprising arms, means to pivotally support the arms at the inner ends on a wheel of a vehicle tangentially to a circle concentric to the axis of the wheel, antiskidding shoes at the outer ends of the arms adapted to engage the roadway, guides for the arms supported on the wheels, means in the guides for limiting the movements of the arms, leaf springs in the guides pressing by their outer ends against the arms for urging them outward, means to support the inner ends of the springs on the wheel, and means to adjust the tension of the springs.

5. An antiskidding device for automotive vehicles comprising arms, means to pivotally support the arms at the inner ends on a wheel of a vehicle, tangentially to a circle concentric to the axis of the wheel, antiskidding shoes at the outer ends of the arms adapted to engage the roadway, guides for the arms supported on the wheels in the shape of flat boxes, leaf springs in the boxes rigidly supported at their inner ends on the guides and pressing by their outer ends against the arms for urging the arms outward, the boxes having end walls for limiting the movement of the arms, and resilient bumpers at the end walls of the boxes for the arms.

6. An antiskidding device for automotive vehicles comprising arms, means to pivotally support the arms at the inner ends on a wheel of a vehicle tangentially to a circle concentric to the axis of the wheel, antiskidding shoes at the outer ends of the arms adapted to engage the roadway, guides for the arms supported on the wheels in the shape of flat boxes, leaf springs in the boxes rigidly supported at their inner ends on the guides and pressing by their outer ends against the arms for urging the arms outward, the boxes having end walls for limiting the movement of the arms, and threaded members adjustably supported at the guides for regulating the pressure of the springs.

7. An antiskidding device for a wheel of an automotive vehicle comprising an annular plate having a flange supported on the wheel concentrically therewith, arms pivotally supported at the inner ends on the plate, antiskidding shoes on the ends of the arms adapted to engage the surface of the road, flat boxes on the plate slidably supporting the middle portions of the arms, and springs in the boxes urging the arms outward, the end walls of the boxes limiting the movement of the arms.

8. An antiskidding device for a wheel of an automotive vehicle comprising a star-shaped annular plate having a flange supported on the wheel concentrically therewith, arms pivotally supported at the inner ends on the plate, antiskidding shoes on the ends of the arms adapted to engage the surface of the road, flat boxes on the plate slidably supporting the middle portions of the arms, and springs in the boxes urging the arms outward, the end walls of the boxes limiting the movement of the arms.

9. An antiskidding device for a wheel of an automotive vehicle comprising an annular plate with a ring-shaped flange at the inner edge, the flange being adapted to be supported on the wheel, arms pivotally supported at their inner ends on the plate near the flange, antiskidding shoes on the ends of the arms adapted to engage the surface of the road, guiding boxes for the middle portions of the arms on the plate, springs in the boxes urging the arms outward, a flat ring rotatively mounted on the flange slidably supported on the plate above the arms and having cam-shaped portions, projecting members on the arms slidably engaging the cam portions, and means to rotate the ring, the cam portions in one position of the ring being adapted to place the arms into raised inoperative position out of contact with the road and in the operative position of the ring being adapted to leave the arms free to slide in the boxes when engaging the road.

10. An antiskidding device for a wheel of an automotive vehicle comprising an annular plate with a ring-shaped flange at the inner edge, the flange being adapted to be supported on the wheel, arms pivotally supported at their inner ends on the plate near the flange, antiskidding shoes on the ends of the arms adapted to engage the surface of the road, guiding boxes for the middle portions of the arms on the plate, springs in the boxes urging the arms outward, a flat ring rotatively mounted on the flange slidably supported on the plate above the arms and having slots with cam-shaped sides, projecting members on the arms slidably engaging the sides of the slots, and means to rotate the ring, the cam-shaped sides of the ring in one position of the ring being adapted to place the arms into raised inoperative position out of contact with the road and in the operative position of the ring being adapted to leave the arms free to slide in the boxes when engaging the road.

11. An antiskidding device for a wheel of an automotive vehicle comprising an annular plate with a ring-shaped flange at the inner edge, the flange being adapted to be supported on the wheel, arms movably supported on the plate, antiskidding shoes on the ends of the arms adapted to engage the surface of the road, guiding boxes for the arms, springs in the boxes urging the arms outward, a flat ring rotatively mounted on the flange slidably supported on the plate and having cam-shaped portions, projecting members on the arms slidably engaging the cam-shaped portions, and means to rotate the ring, the cam portions being adapted in one position to raise the arms into an inoperative position and in the other position to lower the arms into an operative position, limiting the outward movement of the arms but leaving them free to move radially against the action of the springs.

12. An antiskidding device for a wheel of an automotive vehicle comprising an annular plate with a ring-shaped flange at the inner edge, the flange being adapted to be supported on the wheel, arms movably supported on the plate, antiskidding shoes on the ends of the arms adapted to engage the surface of the road, guiding boxes for the arms, springs urging the arms outward, a flat ring rotatively mounted on the flange slidably supported on the plate and having cam-shaped portions, projecting members on the arms slidably engaging the cam-shaped portions, and means to rotate the ring, the cam portions being adapted in one position to raise the arms into an inoperative position and in the other position to lower the arms into an operative position, limiting the outward movement of the arms but leaving them free to move radially against the action of the springs.

LOUIS OTTO E. ROESSEL.